(12) United States Patent
Tornquist et al.

(10) Patent No.: US 7,477,262 B2
(45) Date of Patent: Jan. 13, 2009

(54) AUTOMATIC CALCULATION OF MINIMUM AND MAXIMUM TOLERANCE STACK

(75) Inventors: Clay Tornquist, East Greenwich, RI (US); Todd Jarvinen, West Greenwich, RI (US)

(73) Assignee: Dassault Systemes SolidWorks Corporation, Concord, MA (US)

( * ) Notice: Subject to any disclaimer, the term of this patent is extended or adjusted under 35 U.S.C. 154(b) by 430 days.

(21) Appl. No.: 11/243,358

(22) Filed: Oct. 4, 2005

(65) Prior Publication Data

US 2006/0129259 A1 Jun. 15, 2006

Related U.S. Application Data

(60) Provisional application No. 60/616,397, filed on Oct. 5, 2004.

(51) Int. Cl.
*G06G 7/48* (2006.01)
*G06G 7/00* (2006.01)
*G09G 5/02* (2006.01)
*G05B 19/4097* (2006.01)

(52) U.S. Cl. .................. 345/619; 345/643; 345/652; 382/286; 382/295; 382/300; 702/94; 700/98; 700/95; 700/109; 703/1; 703/2

(58) Field of Classification Search .............. 345/418, 345/581, 586, 606, 619, 630, 468, 643, 649, 345/650, 657, 652, 441; 715/700, 713, 764, 715/768; 702/92, 94, 97, 127; 703/1, 2, 703/6–7; 700/95–98, 108, 109; 382/276, 382/286, 291–296, 300, 302
See application file for complete search history.

(56) References Cited

U.S. PATENT DOCUMENTS

| | | | | |
|---|---|---|---|---|
| 5,106,290 | A | * | 4/1992 | Carver et al. ............... 425/470 |
| 5,323,333 | A | * | 6/1994 | Johnson ....................... 703/1 |
| 5,581,466 | A | | 12/1996 | Van Wyk et al. |
| 5,586,052 | A | | 12/1996 | Iannuzzi et al. |
| 6,963,824 | B1 | | 11/2005 | Davidson et al. |
| 2002/0015036 | A1 | | 2/2002 | Shiroyama et al. |
| 2002/0128810 | A1 | * | 9/2002 | Craig et al. ................... 703/17 |

(Continued)

FOREIGN PATENT DOCUMENTS

EP  0 468 909 A2  1/1992

(Continued)

OTHER PUBLICATIONS

Birgand, J., et al., "Technologie de Conception Mécanique (TCMEC)", 2001, Ecole Centrale De Nantes, France.

(Continued)

*Primary Examiner*—Wesner Sajous
(74) *Attorney, Agent, or Firm*—Hamilton, Brook, Smith & Reynolds, PC

(57) ABSTRACT

Determining a minimum condition and a maximum condition of an assembly of parts includes determining a subset of the assembly of parts, constructing a tolerance chain comprised of tolerance features associated with the parts and that have tolerances that can assume maximum and minimum values, setting at least one tolerance to a minimum value or a maximum value, and calculating the minimum condition and the maximum condition of the assembly based on the setting of the tolerance.

20 Claims, 9 Drawing Sheets

U.S. PATENT DOCUMENTS

| | | | |
|---|---|---|---|
| 2002/0143507 A1* | 10/2002 | Lu et al. | 703/7 |
| 2002/0198680 A1 | 12/2002 | Sato et al. | |
| 2003/0182090 A1 | 9/2003 | Paladini et al. | |
| 2004/0267391 A1* | 12/2004 | Bohn et al. | 700/97 |
| 2006/0106476 A1 | 5/2006 | Tornquist et al. | |

FOREIGN PATENT DOCUMENTS

| | | |
|---|---|---|
| EP | 1 645 924 | 12/2006 |
| EP | 1 645 925 | 12/2006 |
| JP | 2006-107510 | 4/2006 |
| JP | 2006-134305 | 5/2006 |

OTHER PUBLICATIONS

Patent Abstracts of Japan, Publication No. 63-239557, Publication Date Oct. 5, 1988, vol. 013, No. 043, Jan. 31, 1989.

Treacy, P., et al., "Automated Tolerance Analysis for Mechanical Assemblies Modeled with Geometric Features and Relational Data Structure", Computer-Aided Design, vol. 23, No. 6, Jul./Aug. 1991, pp. 444-453.

Chase, Kenneth W., et al., "A Comprehensive System for Computer-Aided Tolerance Analysis of 2-D and 3-D Mechanical Assemblies", Proceedings of the 5$^{th}$ International Seminar on Computer-Aided Tolerancing Toronto, Canada, Apr. 27-29, 1997, ADCATS Publication #97-4.

* cited by examiner

Fig. 6

| Feature | Tx | Ty | Tz | Rx | Ry | Rz | Size | Form | Tolerance |
|---|---|---|---|---|---|---|---|---|---|
| Front | X | X | | | | X | X | | |
| Back | X | X | | | | X | X | | |
| Left | X | X | | | | X | X | | |
| Right | X | X | X | X | X | X | X | X | Plus/Minus |
| Top | X | X | | | | X | X | | |
| Bottom | X | X | | | | X | X | | |
| Hole | | | X | | | X | | | |
| Pin | | | X | | | X | | | |
| Pin End | X | X | | | | X | X | | |

AUTOMATIC CALCULATION OF MINIMUM AND MAXIMUM TOLERANCE STACK

This patent application claims priority to U.S. Provisional Patent Application No. 60/616,397 filed Oct. 5, 2004 entitled "Automatic Calculation of Minimum and Maximum Tolerance Stack."

BACKGROUND OF THE INVENTION

Computer-aided design (CAD) software allows a user to construct and manipulate complex three-dimensional (3D) models. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD systems may combine these and other modeling techniques, such as parametric modeling techniques. Parametric modeling techniques can be used to define various parameters for different features and components of a model, and to define relationships between those features and components based on relationships between the various parameters.

CAD systems may also support two-dimensional (2D) objects, which are 2D representations of 3D objects. Two- and three-dimensional objects are useful during different stages of a design process. Three-dimensional representations of a model are commonly used to visualize a model in a physical context because the designer can manipulate the model in 3D space and can visualize the model from any conceivable viewpoint. Two-dimensional representations of a model are commonly used to prepare and formally document the design of a model.

CAD systems may display tolerance information to describe manufacturing parameters for a model. Tolerance information may specify allowable deviations in a feature from specified dimensions or locations. For example, a plus/minus tolerance specification can indicate an allowable positional deviation of a feature in a manufactured part.

Design and manufacturing engineers may need to know the minimum and maximum values for an assembly dimension to ensure that the assembly once manufactured will function as designed. Typically, the minimum and maximum dimensions are dependent upon the order in which parts are mated in an assembly and the numerous tolerance values throughout the assembly.

The minimum and maximum condition may be computed manually. To manually calculate the minimum and maximum tolerances, for each tolerance in the assembly, the engineer determines the minimum and maximum condition and the impact of these conditions on other features and parts in the assembly. Manually calculating the minimum and maximum tolerances can be a laborious task.

Commercially available tolerance analysis software that automatically calculates minimum and maximum tolerances exists. A common computerized technique for performing tolerance analysis is based on Monte Carlo simulation. This technique creates a simulation model for each feature in the assembly based upon the applied tolerances. For numerous iterations, exact values for the plus/minus tolerances are randomly selected and the resultant values for assembly dimensions of interest are tracked. Monte Carlo simulation statistically determines the probability of various values for the dimensions of interest. The speed of a Monte Carlo simulation depends upon the size of the model, the number of tolerances, the number of iterations, and available computing resources, among other parameters. To be most effective, Monte Carlo simulation generally requires engineers to have an expertise in the field of tolerance simulation and statistics.

Another computerized tolerance analysis technique is based upon kinematics linkages. Constraints are assigned and are based upon the tolerances that have been applied to the tolerance features in an assembly. The kinematics model is then manipulated to determine the possible values for the assembly dimensions. While not suffering from performance problems, in general, the kinematics linkages technique does not solve for the complete breadth of the ASME Y14.5M and ISO 1101 tolerance standards.

A 3D CAD system that can rapidly compute the minimum and maximum conditions of an assembly based on applied tolerances as well as the root sum squared (RSS) values, does not need to involve a simulation expert to analyze tolerances, and implements the ASME Y14.5 and ISO 1101 standards would enhance the capabilities and ease of use of a 3D CAD system.

SUMMARY OF THE INVENTION

In general, in one aspect, the invention features a computer-implemented method for determining a minimum condition and a maximum condition of an assembly of parts. The method includes determining a subset of the assembly of parts and constructing a tolerance chain comprised of tolerance features. Each tolerance feature is associated with a part and each tolerance feature has a tolerance that can assume a minimum value and a maximum value. At least one tolerance is set to a minimum value or a maximum value. The minimum condition and the maximum condition of the assembly are calculated based on the setting of the tolerance value.

Implementations may include selecting a first and second feature for measurement of an assembly dimension. The assembly measurement may be an angular or distance measurement. Implementations may also include specifying a direction vector to identify a direction of movement that produces the maximum and minimum condition of the assembly, and selecting the tolerance to set based on the certainty that the size or the position of the part associated with the tolerance feature will change and cause movement in the direction of movement. Furthermore, the tolerance of each one of the tolerance features can be set to an accompanying minimum or maximum value to cause movement along the direction vector. When determining the subset of parts, the order in which the parts are assembled is analyzed and a cross-part association (which may be a mating relationship) is identified. Implementations may also include computing the root sum squared of the minimum or the maximum condition.

The details of one or more embodiments of the invention are set forth in the accompanying drawings and the description that follows. Other features, objects, and advantages of the invention will be apparent from the description and drawings, and from the claims.

DESCRIPTION OF THE DRAWINGS

FIG. 6 is a table showing constraints imposed on tolerance features.

DETAILED DESCRIPTION OF THE INVENTION

The present invention facilitates the computation of minimum and maximum conditions of an assembly based upon the tolerances applied to individual parts in the assembly. In addition to the minimum and maximum conditions, the present invention computes the industry accepted practice of the root sum squared (RSS) minimum and maximum conditions.

The present invention solves the tolerance analysis problem using a push-pull technique. The push-pull technique analyzes the tolerances and assembly methods (e.g., cross-part associations), for each part in an assembly to determine a complete tolerance chain for the assembly dimension of interest. The tolerance chain is then pushed and pulled to find the minimum and maximum assembly conditions for an assembly dimension of interest.

Using the present invention, engineers are able to predict the effect tolerances have on the form, fit, and function of the assembly prior to manufacturing the assembly. Due to the foregoing, the present invention enhances the capabilities of a computerized modeling system.

Figure 1:
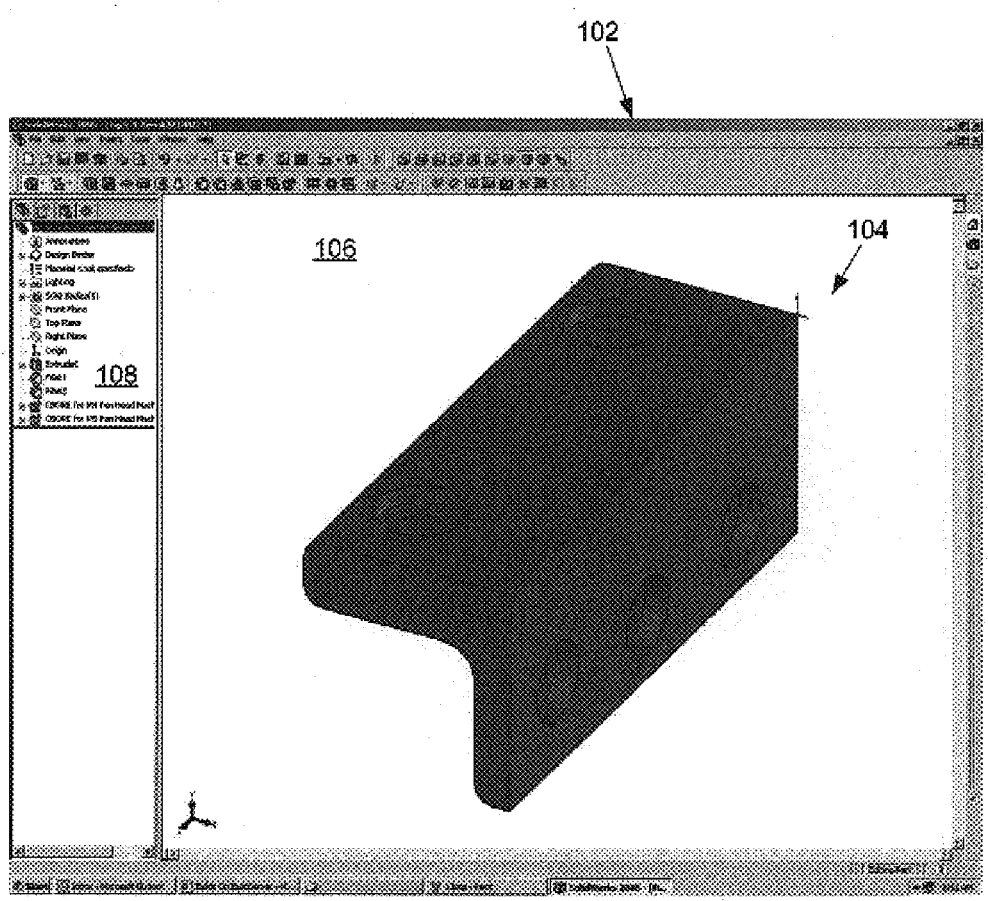
FIG. 1 is an illustration of a computer-generated model displayed in a window.

FIG. 1 shows a window 102 displayed on a CRT and generated by modeling software executed by a computerized modeling system, an example of which is later shown with reference to FIG. 9. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. The surfaces of the 3D model 104 can be displayed, or the 3D model 104 can be displayed using solid lines and dashed lines to show visible edges and hidden edges, respectively, of the 3D model. Implementations also may include other window areas, such as a feature manager design tree 108, which helps the engineer visualize and manipulate the 3D model 104, as well as components of the 3D model 104. In addition, the feature manager design tree 108 may represent the order in which parts in an assembly are assembled by virtue of the hierarchical ordering of the parts in the feature manager design tree 108.

Figure 2:
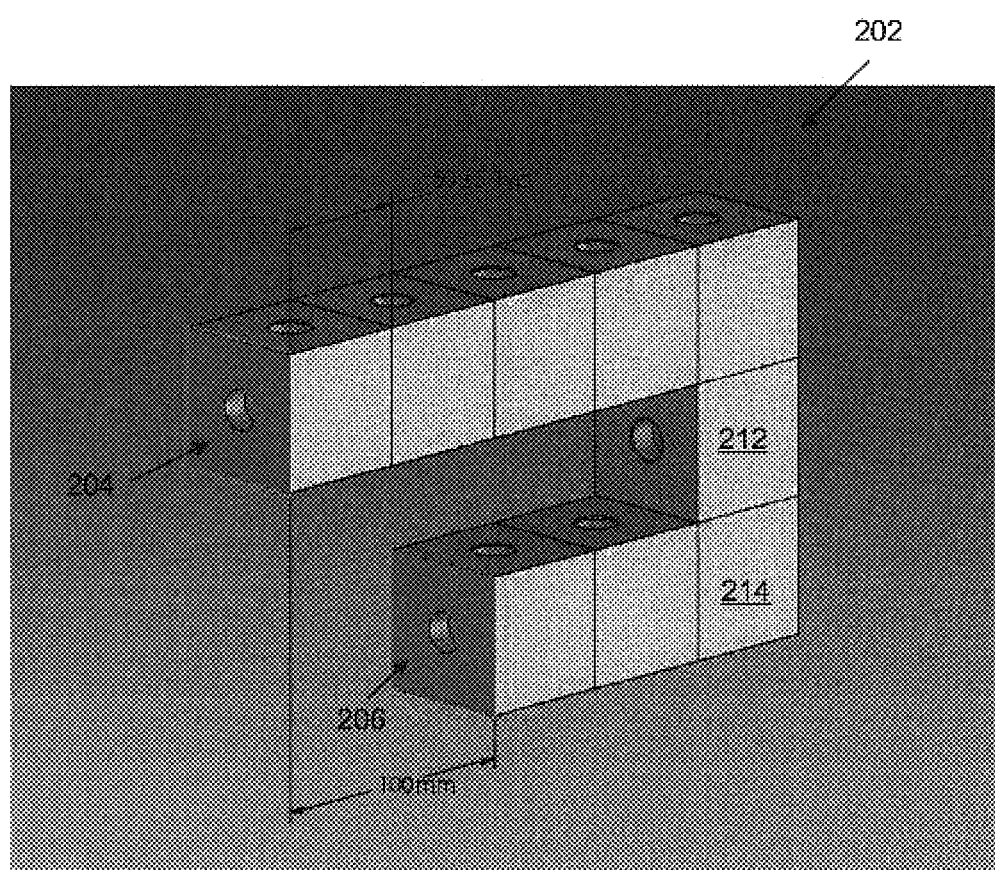
FIG. 2 is an illustration of an assembly and shows a dimension between two features.

FIG. 2 illustrates an assembly 202, which will be used to illustrate the concepts of pushing and pulling tolerances to compute the minimum and maximum values between an upper left-hand face 204 and a lower left-hand face 206. In FIG. 2, the assembly 202 is shown with a nominal assembly dimension of 100 mm extending from the upper left-hand face 204 to the lower left-hand face 206 along the 100 mm dimension annotation. Although only one block is labeled as such, each block in the assembly except the middle block 212 situated between the two rows of blocks and the lower right block 214 each have a horizontal tolerance of 50±5, meaning that the width of each block can be as great as 55 mm and as small as 45 mm. The middle block 212 and the lower right block 214 have been rotated and each has a vertical tolerance. Moreover, each block is attached to another block via a pin-to-hole connection, which is not visible in FIG. 2 due to the orientation of the pin connections.

Figure 3:
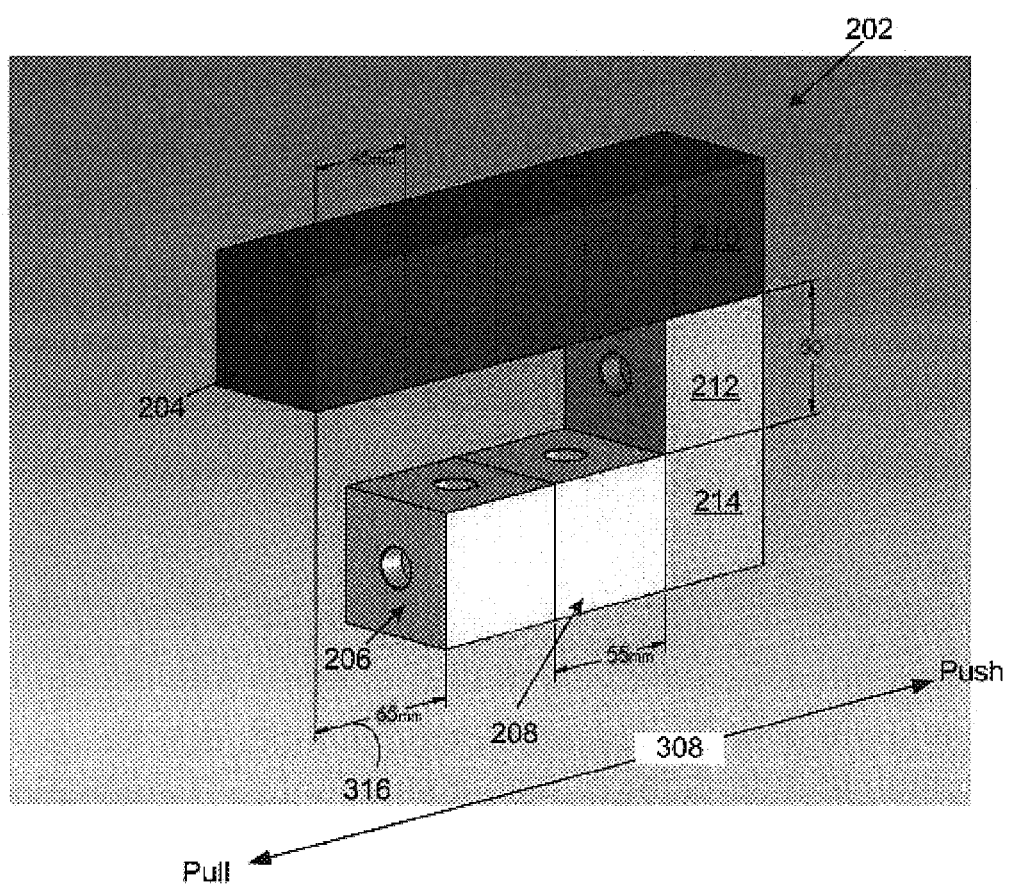
FIG. 3 is an illustration of an assembly and shows dimensions.

FIG. 3 shows how pulling and pushing along a direction vector 308 of the defined assembly dimension obtains the minimum assembly dimension 316 of 65 mm. Each of the five blocks in the top row of blocks in assembly 202 is pushed to the minimum size of 45 mm. The two leftmost blocks in the bottom row 206, 208 are pulled to the maximum size of 55 mm. The center and bottom rightmost blocks 212, 214 have no affect on the assembly dimension because the vertical tolerances are perpendicular to the direction of the assembly dimension of interest, and therefore, each remains at the nominal size of 50 mm.

Figure 4:
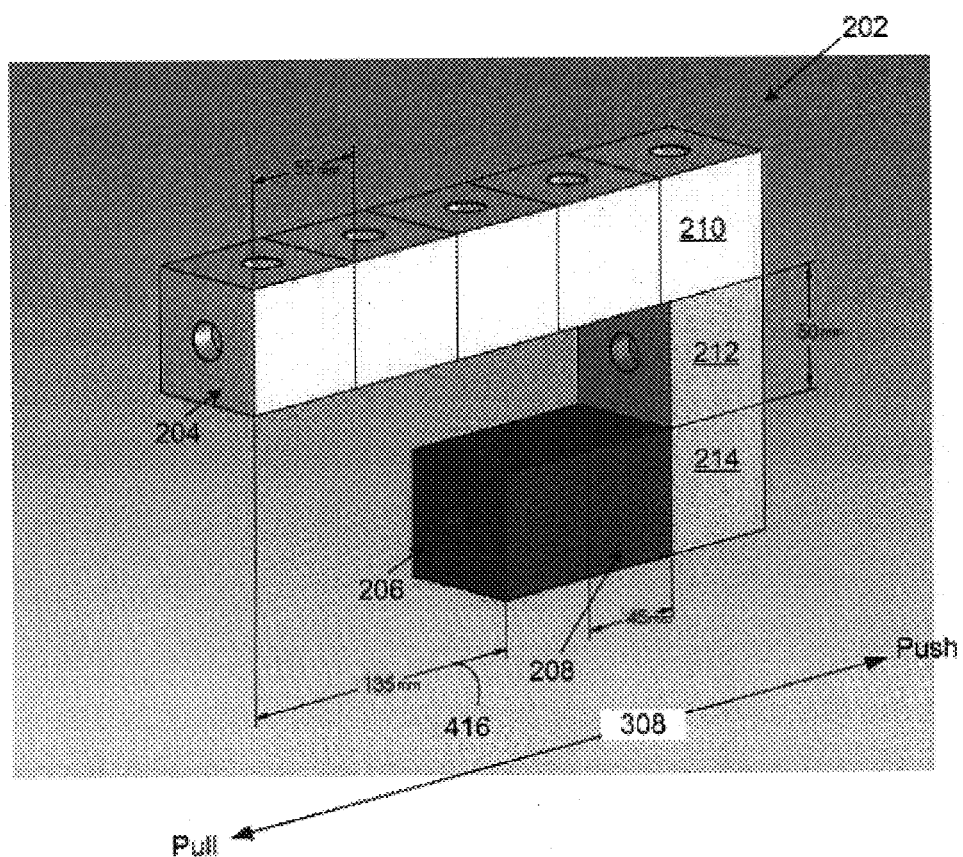
FIG. 4 is an illustration of an assembly and shows dimensions.

FIG. 4 shows how pulling and pushing along the direction vector 308 of the defined assembly dimension obtains the maximum assembly dimension 416 of 135 mm. The top row of blocks in the assembly 202 are pulled to their maximum size of 55 mm; whereas the two leftmost blocks in the bottom row 206, 208 are pushed to their minimum size of 45 mm. The center and bottom rightmost blocks 212, 214 have no affect on the assembly dimension because the vertical tolerances are perpendicular to the direction of the assembly dimension of interest, and thus each remains at the nominal size of 50 mm.

Figure 5:
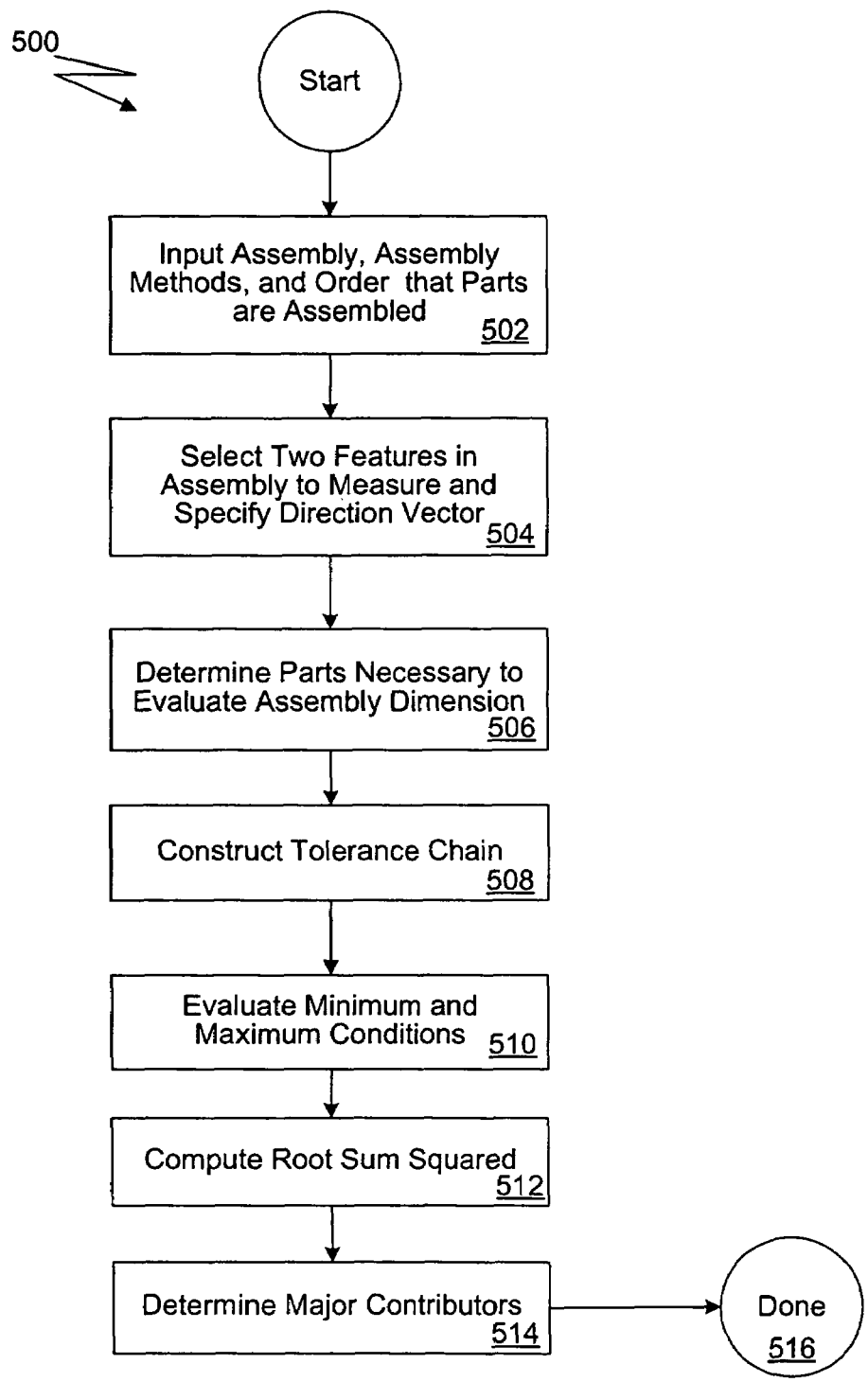
FIG. 5 is a flowchart of a procedure that determines maximum and minimum conditions.

Referring now to FIG. 5, a flowchart of a procedure 500 that determines minimum and maximum conditions is shown. Inputs to the procedure 500 are an assembly of parts, assembly methods, and the order in which the parts in the assembly are assembled (step 502). The assembly input to the procedure 500 contains parts and tolerances (e.g., diameter, flatness, position), where each part in the assembly may contain tolerance features (e.g., planes, holes, pins, cones) to which the tolerances are applied. Each part in the assembly contains data that is sufficient to describe how the part is assembled and to describe the assembly dimension of interest that will be evaluated.

The assembly methods that are input specify cross-part associations such as in-context relationships and connectivity relationships of assembly components. Mates are an example of a cross-part association, and are two or more parts that have compatible geometric characteristics. The parts are positioned with respect to one another such that at least one geometric feature of one part is mated with at least one geometric feature in another part. Commercially available CAD systems support mates. For example, SolidWorks® 2005 software, a product of SolidWorks Corporation of Concord, Mass., supports mates and identifies mates and mate features in a data structure that defines an assembly of parts.

The program structure containing the order in which the parts in the assembly are assembled may take the form of an ordered list of the parts in the assembly or a data structure defining the parts in the assembly. The order may be implicit in the data structure. For example, given a tree data structure that defines the assembly, parts defined at higher levels of the tree structure may be considered assembled before parts defined at lower levels of the tree structure. Additionally, a left to right arrangement of parts at the same level in the tree structure may dictate that a part to the left of another part is assembled prior to the other part to the right. Other embodiments of the present invention may provide other means of defining the order of assembly, such as allowing an engineer to explicitly specify order.

In the next step in the procedure 500, two features in the input assembly are selected and a direction vector is specified to measure an assembly dimension (step 504). Hereinafter, the first feature selected will be referred to as a From Feature and the second feature selected will be referred to as a To Feature. To select the From Feature and the To feature, a pointing device, such as a mouse, can be used to pick the desired features of the 3D model displayed in a window on a CRT. To specify the direction vector, a geometric entity of the From Feature and a geometric entity of the To Feature may be picked using a pointing device. By way of non-limiting example, such geometric entities may be points or edges. To illustrate, to measure an assembly dimension between face 204 and face 206 shown in FIG. 3 and FIG. 4, a leftmost vertical edge in face 204 and a leftmost vertical edge in face 206 can be selected to specify the direction vector 308.

An embodiment of the present invention, may only allow specific orientations of the direction vector. For example, the direction vector may only be allowed to be along the x-axis, the y-axis, or the z-axis of the model, normal to a selected face or along a selected edge, or the normal distance between the From and To features.

The direction vector can be visualized as a line showing the assembly dimension between the two geometric entities, and may include an annotation of the nominal assembly dimension. Alternatively, the direction vector can be visualized separate from the assembly dimension as a line that simply shows direction without indicating assembly dimension. The engineer may also be required to assist with the orientation of the direction vector by, for example, using a pointing device to move the endpoints of the rendered direction vector to achieve the appropriate orientation. Furthermore, the engineer may specify the type of measurement for which the direction vector will be used, such as an angular measurement or a distance measurement.

Continuing to refer to FIG. 5, the procedure 500 next determines the parts that are required to evaluate the assembly dimension (step 506). Such determination establishes a reduced assembly, and thereby decreases the number of calculations necessary to compute the assembly dimension because only those parts contributing to the minimum and maximum conditions are further analyzed.

The order in which the parts are assembled, which was input in step 502, is used to determine which parts are required to evaluate the assembly dimension. Any parts assembled before the From Feature or after the To Feature are not considered in the analysis of which parts are required to evaluate the assembly dimension because manipulating the tolerances of these parts have no effect on the minimum and maximum conditions of the assembly dimension.

To further determine the parts that are required to evaluate the assembly, cross-part associations (e.g., mating relationships), input to the procedure 500 as assembly methods are identified. By way of non-limiting example, two parts may be recognized as mates because the assembly data structure contains a pointer construct identifying the two parts as mates. As apparent to those of ordinary skill in the art, the assembly methods need not be a distinct input to procedure 500, but rather may be intrinsic to the data structure defining the input assembly.

When a cross-part association exists between two parts of interest, both parts may be required to evaluate the assembly dimension. This step 506, first analyzes the From Feature to determine whether a cross-part association exists. If a cross-part association is found, procedure 500 adds the part containing the From Feature and the associated second part in order to a list of parts that must be evaluated (i.e., the evaluation list). The associated second part is then analyzed to determine if the associated second part has any cross-part associations with a third part, and if so, the associated third part is added to the evaluation list as the third item. The process of determining whether a part in the evaluation list has a cross-part association, and if so, adding the other associated part to the evaluation list continues until a part is found containing the To Feature. Moreover, for parts having multiple cross-part associations, each cross-part association is taken into account and the evaluation list assumes tree data structure configuration. Parts are removed from the evaluation list that do not fall within a path of the tree structure between the From Feature and the To Feature.

Once the reduced assembly is known by virtue of the evaluation list, a continuous chain of tolerance features is constructed (step 508). The continuous chain of tolerance features (hereinafter referred to as a tolerance chain) is a path from the From Feature through various tolerance features to the To feature. The various tolerance features in the tolerance chain between the From Feature and the To Feature belong to the parts in the reduced assembly. Moreover, the various tolerance features are features that are capable via specified tolerances of producing a movement in a part along the direction vector. For example, a hole tolerance feature having a diameter with a plus/minus tolerance and an axis perpendicular to a plane representing a side of a part may not affect a dimension of the side of the part; however, an in-context relationship may specify that as the diameter of the hole increases a dimension of the side of the part also increases.

To determine which tolerance features are capable of producing movement of a part along the direction vector, each part in the reduced assembly is evaluated by a tolerance verification process. The tolerance verification process determines constraints imposed on each tolerance feature and the order in which the features of a part should be manufactured such that datums and plus/minus reference features are manufactured before the tolerance features that reference the datums and plus/minus reference features. Additionally, the tolerance verification process ascertains which tolerances will participate in the computation of the minimum and maximum conditions (i.e., the tolerance stack).

FIG. 6 shows a table that may be generated to determine constraints imposed on each tolerance feature. In FIG. 6, all tolerance features of a part are listed in the first column of the table. Moreover, the tolerance features are listed in the order in which the features need to be manufactured. The second through ninth columns in the table list the degrees of control, which include the degrees of freedom, size, and form. The last column in the table indicates whether a tolerance is applied to a particular feature. The only tolerance applied to the part is the plus/minus tolerance on the Right feature. An "X" denotes that the respective tolerance feature has been constrained by at least one existing tolerance for a particular degree of control, or the degree of control is not important or has no value in the computation of the minimum and maximum conditions. The empty fields in the table represent un-constrained conditions.

Referring back to FIG. 5, once the tolerance chain is constructed, the minimum and maximum dimensions are evaluated (step 510). All tolerance features in the tolerance chain having tolerances that affect the size or location of the parts in the reduced assembly are manipulated to the furthest extent (e.g., the Right feature shown in FIG. 6). By manipulating the tolerances to the furthest extents, the minimum and maximum conditions are found. The tolerance features in the tolerance chain are pushed and pulled along the direction vector based upon the degree of control (i.e., the constraint status shown in FIG. 6) as far as the applied tolerances allow. Generally, when pulled, the maximum plus/minus tolerance is set for a specific tolerance; whereas when pushed, the minimum plus/minus tolerance is set for the specific tolerance. Whether a tolerance is pushed or pulled depends on the location of the particular tolerance feature in relationship to the To Feature.

An implementation may not require that all features in a tolerance chain have tolerances. For example, a primary datum feature may be in the tolerance chain but if the primary datum feature is a plane, a tolerance will not be applied. Furthermore, not all features in the tolerance chain have tolerances that affect size and/or location of the parts in the reduced assembly.

Figure 7:
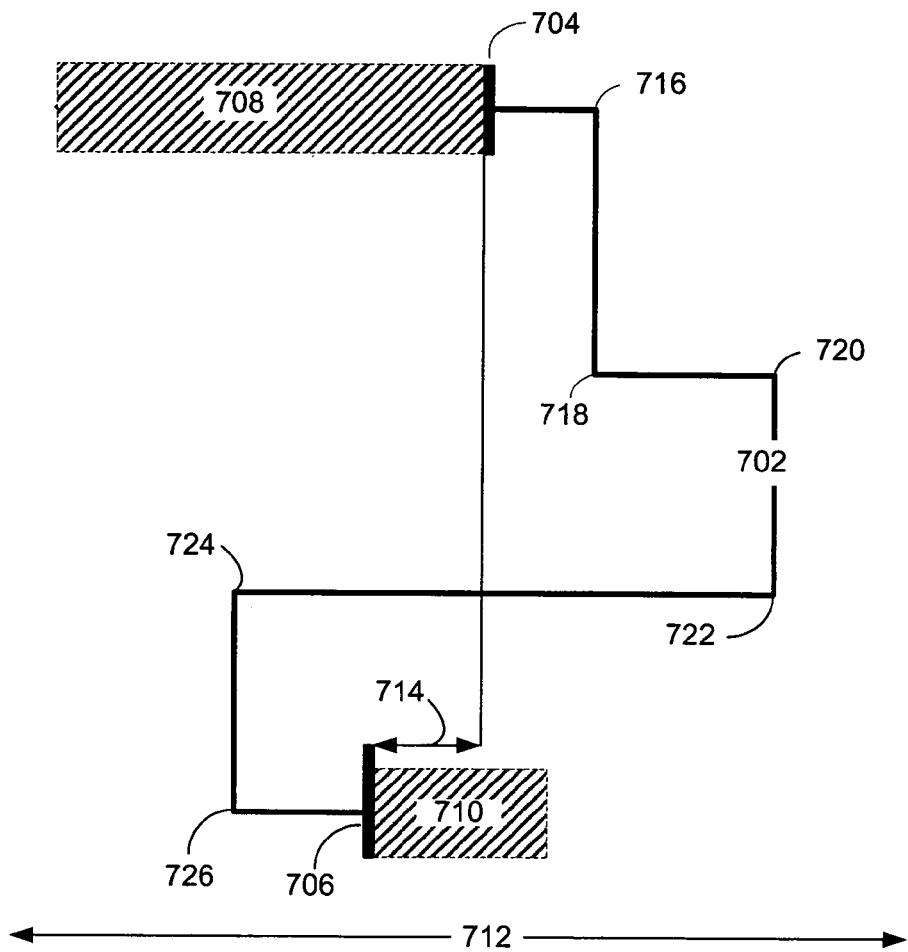
FIG. 7 is a conceptual illustration of a reduced assembly.

Referring now to FIG. 7, a conceptual illustration of a reduced assembly is shown. A bold line represents a tolerance chain 702 between a From Feature 704 and a To Feature 706. Shaded areas 708, 710 represent parts that are not in the reduced assembly, and therefore, not considered in a minimum and maximum condition analysis because shaded area 708 is assembled before From Feature 704 and shaded area 710 is assembled after To Feature 706. Direction vector 712 shows the direction in which the tolerances in the tolerance chain 702 are to be pushed and pulled. An assembly dimension 714 shows the dimension being measured between the From Feature 704 and the To Feature 706.

To compute the maximum value, starting from the From Feature 704, each tolerance feature in the tolerance chain is moved along the direction vector 712 in the amount allowed by the tolerance zones applied to the tolerance feature (i.e., the boundaries within which the feature can lie). In effect the parts from the From Feature 704 to location 716 are reduced in size to a minimum size along the direction vector 712 as are the parts from location 718 to location 720 and the parts from location 726 to the To Feature 706. The parts from location 722 to location 724 are increased in size to a maximum size along the direction vector 712. This example assumes that parts between location 716 and location 718, parts between location 720 and location 722, and parts between location 724 and location 726 do not participate in the movement along the direction vector 712.

To compute the minimum value, starting from the From Feature 704, each tolerance feature in the tolerance chain is moved along the direction vector 712 in the amount allowed by the tolerance zones applied to the tolerance feature. In effect the parts from the From Feature 704 to location 716 are increased in size to a maximum size along the direction vector as are the parts from location 718 to location 720 and the parts from location 726 to the To Feature 706. The parts from location 722 to location 724 are reduced in size to a minimum size along the direction vector 712. This once again assumes that parts between location 716 and location 718, parts between location 720 and location 722, and parts between location 724 and location 726 do not participate in the movement along the direction vector 712.

Referring once again to FIG. 5, upon completion of evaluating minimum and maximum conditions (step 510), the engineer can request that the assembly visually reflect the minimum or the maximum condition. In an embodiment, the present invention creates an assembly of parts in the minimum condition and an assembly of parts in the maximum condition. Either one of these assembly of parts may be displayed by the computerized modeling system, along with a properly annotated assembly dimension. Additionally, an embodiment can display the configurations of an assembly while minimum and maximum conditions are being calculated.

The procedure 500 also computes the RSS value (step 512). The RSS value is calculated by taking the square root of the sum of the square of each of the individual feature motions.

The procedure 500 also determines which tolerance features are the major contributors to the minimum and maximum conditions (step 514). To determine the major contributors, first the distance that each tolerance feature has been moved is recorded. The contribution of each feature to the resultant assembly dimension, in the form of a percentage, is obtained by dividing the individual feature motion by the resultant assembly dimension. Knowing the major contributors, an engineer may decide to modify a tolerance feature that is a major contributor or a tolerance thereof to reduce the variance between the minimum and maximum conditions. The present invention also allows for real-time tolerance fine tuning. For example, for the top contributors to the minimum and maximum conditions, the engineer can use a set of controls to modify the tolerances and see the results of manipulating the tolerances in real time.

Figure 8A:
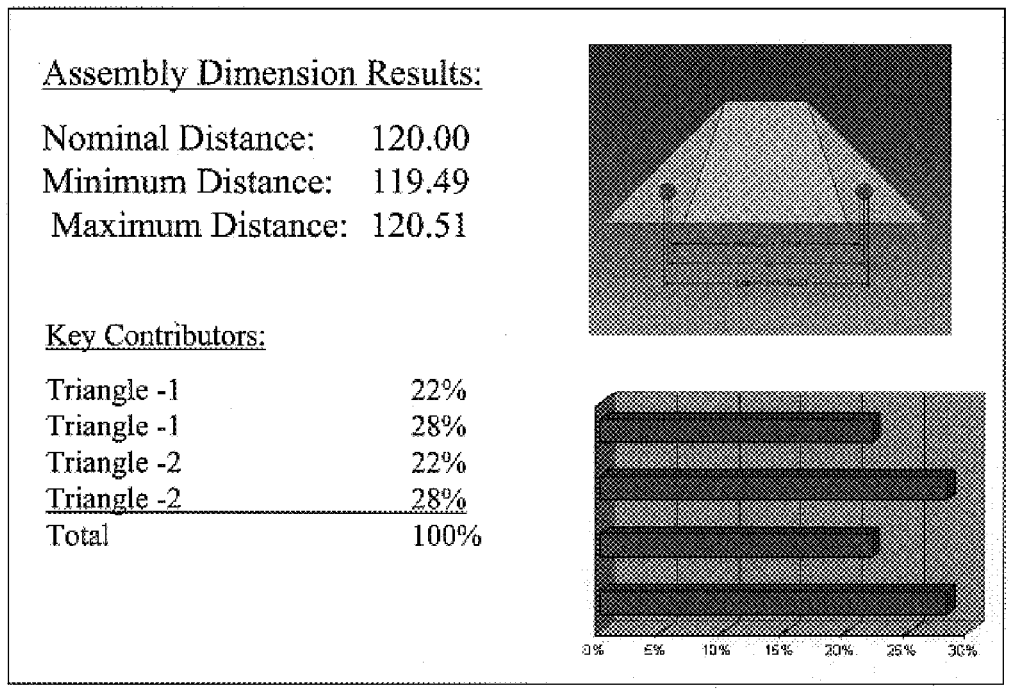
FIG. 8A is an illustration of a report.
Figure 8B:
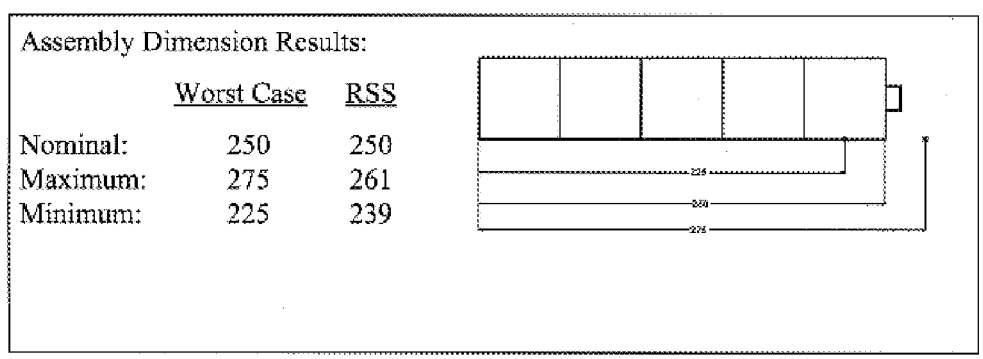
FIG. 8B is an illustration of a report.

The minimum and maximum assembly dimension, the RSS assembly dimension values, and the percent contribution for each feature may be output by the procedure 500 in the form of a report. FIG. 8A and FIG. 8B show examples of reports that may be output.

The present invention can also indicate when a critical assembly dimension reaches a limit. For example, a sound can be output by the computerized modeling system to alarm the engineer when the tolerance stack exceeds specified limits or when the tolerance stack falls back within specified limits. Moreover, the engineer can set critical assembly dimensions with minimum and maximum design limits to specify alarm parameters.

One advantage of the present invention is that an engineer performing interactive design functions using a computerized modeling system can solve minimum and maximum tolerance conditions quickly, and has the opportunity to immediately modify a feature or tolerance to ensure that parts can be assembled as required. Another advantage of the present invention is that the creation of a reduced assembly enables the present invention to only consider parts having movements that affect the minimum and maximum conditions, and thereby, contributes to obtaining a quick result.

Figure 9:
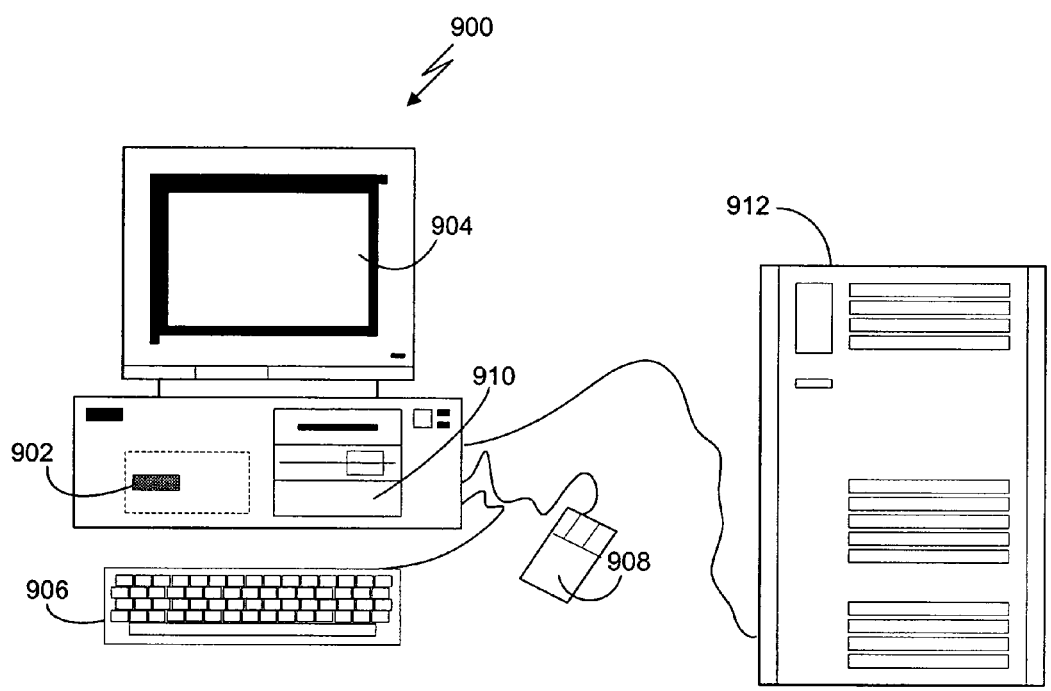
FIG. 9 is a diagram of a computer system.

FIG. 9 shows a computerized modeling system 900 that includes a CPU 902, a CRT 904, a keyboard input device 906, a mouse input device 908, and a storage device 910. The CPU 902, CRT 904, keyboard 906, mouse 908, and storage device 910 can include commonly available computer hardware devices. For example, the CPU 902 can include a Pentium-based processor. The mouse 908 may have conventional left and right buttons that the user may press to issue a command to a software program being executed by the CPU 902. As an alternative or in addition to the mouse 908, the computerized modeling system 900 can include a pointing device such as a trackball, touch-sensitive pad, or pointing device and buttons built into the keyboard 906. Those of ordinary skill in the art appreciate that the same results described herein with reference to a mouse device can be achieved using another available pointing device. Other appropriate computer hardware platforms are suitable as is apparent from the discussion herein. Such computer hardware platforms are preferably capable of operating the Microsoft Windows NT, Windows 98, Windows 2000, Windows XP, Windows ME, UNIX, Linux, or MAC OS operating systems.

Additional computer processing units and hardware devices (e.g., rapid prototyping, video, and printer devices) may be included in the computerized modeling system 900.

Furthermore, the computerized modeling system 900 may include network hardware and software thereby enabling communication to a hardware platform 912, and facilitating communication between numerous computer systems that include a CPU and a storage system, among other computer components.

Computer-aided modeling software may be stored on the storage device 910 and may be loaded into and executed by the CPU 902. The modeling software allows a user to create and modify a 3D model and implements aspects of the invention described herein. The CPU 902 uses the CRT 904 to display a 3D model and other aspects thereof as described. Using the keyboard 906 and the mouse 908, the user can enter and modify data associated with the 3D model. The CPU 902 accepts and processes input from the keyboard 906 and mouse 908. The CPU 902 processes the input along with the data associated with the 3D model and makes corresponding and appropriate changes to that which is displayed on the CRT 904 as commanded by the modeling software. In one embodiment, the modeling software is based on a solid modeling system that may be used to construct a 3D model consisting of one or more solid and surface bodies. However, the present invention can be utilized to deform a model that is internally represented in other forms. Additionally, the modeling software may allow for relationships that parametrically constrain the definitions of one or more bodies or features therein with respect to one another. If a parametrically constrained relationship exists between two features, a geometric modification to one feature may cause a geometric modification in the other feature.

The invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory. Storage devices suitable for tangibly embodying computer program instructions and data include all forms of non-volatile memory (including by way of example semiconductor memory devices, such as EPROM, EEPROM, and flash memory devices), magnetic disks such as internal hard disks and removable disks, magneto-optical disks, and CD-ROM disks. Any of the foregoing may be supplemented by, or incorporated in, custom-designed ASICs (application-specific integrated circuits).

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged.

Accordingly, other embodiments are within the scope of the following claims.

What is claimed is:

1. A computer-implemented method for determining a minimum condition and a maximum condition of an assembly comprised of a plurality of parts, the method comprising:
   determining a subset of the plurality of parts, the subset comprised of members of the plurality of parts having a tolerance feature capable of affecting the minimum condition and the maximum condition of the assembly;
   constructing a tolerance chain comprised of a plurality of tolerance features, wherein:
   each tolerance feature has an association with one part in the subset of parts; and
   each tolerance feature has a tolerance that can assume a minimum value and a maximum value;
   setting the tolerance of at least one of the plurality of tolerance features to one of the minimum value and the maximum value;
   calculating at least one of the minimum condition and the maximum condition of the assembly based on the setting of the tolerance;
   specifying a direction vector to identify a direction of movement that produces the maximum condition and the minimum condition of the assembly; and
   selecting the tolerance to set based on a certainty that one of a position and a size of the art associated with the tolerance feature will change and cause movement in the direction of movement.

2. The computer-implemented method of claim 1, further comprising selecting a first feature and a second feature for measurement of an assembly dimension between the first feature and the second feature.

3. The computer-implemented method of claim 2, wherein the assembly dimension is one of an angular measurement and a distance measurement.

4. The computer-implemented method of claim 1, further comprising setting the tolerance of each one of the plurality of tolerance feature to one of an accompanying minimum value and a corresponding maximum value to cause movement along the direction vector.

5. The computer-implemented method of claim 1, wherein determining the subset of the plurality of parts comprises:
   analyzing an order in which the plurality of parts are assembled; and
   identifying a cross-part association between a pair of parts in the assembly.

6. The computer-implemented method of claim 5, wherein the cross-part association is a mating relationship.

7. The computer-implemented method of claim 1, further comprising computing the root sum squared of at least one of the minimum condition and the maximum condition.

8. The computer-implemented method of claim 1, further comprising determining which tolerance feature is a major contributor to one of the minimum condition and the maximum condition.

9. A computer-readable data storage medium comprising instructions for causing a computer system to:
   receive input of an assembly comprised of a plurality of parts;
   receive input of a plurality of methods used to construct the assembly;
   select a first feature and a second feature in the assembly between which to calculate an assembly dimension;

specify a direction of movement for the assembly;

determine a subset of the plurality of parts required to calculate the assembly dimension, the determination based on the plurality of methods used to construct the assembly;

build a tolerance chain comprised of a plurality of features in the subset of parts, the tolerance chain forming a continuous path of features from the first feature to the second feature; and set a tolerance value for each of the plurality of features that affects one of a minimum condition and a maximum condition in the direction of movement.

10. The data storage medium of claim 9, further comprising instructions for causing a computer system to:

receive as input an order in which the plurality of parts are assembled to form the assembly; and analyze the order in which the plurality of parts are assembled to aid in determining the subset of the plurality of parts.

11. The data storage medium of claim 9, wherein one of the plurality of methods defines a mating relationship between a first part in the subset of parts and a second part in the subset of parts.

12. The data storage medium of claim 9, further comprising instructions for causing a computer system to determine constraints imposed on each feature of the plurality of features to ascertain whether each feature can produce movement of the assembly in the direction of movement depending on the tolerance value corresponding to each feature.

13. The data storage medium of claim 9, further comprising instructions for causing a computer system to compute the root sum squared of at least one of the minimum condition and the maximum condition.

14. The data storage medium of claim 9, further comprising instructions for causing a computer system to:

render the assembly on a computer screen to illustrate at least one of the minimum condition and the maximum condition in the direction of movement; and render the assembly dimension on the computer screen.

15. A computer-aided design system comprising:

a processor operatively coupled to a data storage system, the data storage system storing a three-dimensional model of an assembly; and a data storage memory operatively coupled to the processor and comprising instructions to configure the processor to:

select a first feature and a second feature in the assembly to facilitate the specification of an assembly dimension, wherein:

the assembly is comprised of a plurality of parts;

the first feature aids in the definition of a first part in the plurality of parts;

the second feature aids in the definition of a second part in the plurality of parts; and the assembly dimension differs depending on a tolerance value applied to a tolerance feature aiding in the definition of one of the plurality of parts;

specify a direction vector for indicating a direction of movement caused by a change in at least one of position and size of the tolerance feature, the change resulting from the tolerance value applied;

determine which ones of the plurality of parts are required to calculate the assembly dimension; and calculate a dimension between the first feature and the second feature.

16. The computer-aided design system of claim 15, wherein the assembly dimension is one of an angular measurement and a distance measurement.

17. The computer-aided design system of claim 15, wherein an existence of a cross-part association determines that ones of the plurality of parts associated in the cross-part association are required to calculate the assembly dimension.

18. The computer-aided design system of claim 17, wherein the cross-part association is a mating relationship.

19. The computer-aided design system of claim 15, further comprising instructions to configure the processor to:

construct a tolerance chain comprised of a plurality of tolerance features wherein each tolerance feature in the tolerance chain has a tolerance that affects a minimum condition and a maximum condition of the assembly; and assign a value to the tolerance of each tolerance feature in the tolerance chain that results in one of the minimum condition and the maximum condition being realized.

20. The computer-aided design system of claim 19, further comprising instructions to configure the processor to:

render at least one of the minimum condition of the assembly and the maximum condition of the assembly; and render the assembly dimension.

* * * * *